(12) United States Patent
Frank et al.

(10) Patent No.: US 6,490,671 B1
(45) Date of Patent: Dec. 3, 2002

(54) SYSTEM FOR EFFICIENTLY MAINTAINING TRANSLATION LOCKASIDE BUFFER CONSISTENCY IN A MULTI-THREADED, MULTI-PROCESSOR VIRTUAL MEMORY SYSTEM

(75) Inventors: Richard L. Frank, Groton, MA (US); Gopalan Arun, Nashua, NH (US); Michael J. Cusson, Chelmsford, MA (US); Daniel E. O'Shaughnessy, Hollis, NH (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/321,990

(22) Filed: May 28, 1999

(51) Int. Cl.[7] .......................... G06F 12/08; G06F 12/10
(52) U.S. Cl. ...................... 711/207; 711/202; 711/206; 711/208
(58) Field of Search ............................... 711/202, 206, 711/207, 208, 1; 709/213

(56) References Cited

U.S. PATENT DOCUMENTS

| | | | | |
|---|---|---|---|---|
| 4,779,188 A | * | 10/1988 | Gum et al. ..................... 709/1 |
| 5,317,705 A | * | 5/1994 | Gannon et al. ............. 709/100 |
| 5,437,017 A | * | 7/1995 | Moore et al. ............... 709/213 |
| 5,574,878 A | * | 11/1996 | Onodera et al. ............. 711/207 |
| 5,710,903 A | * | 1/1998 | Horiuchi et al. ................ 711/1 |
| 5,790,851 A | | 8/1998 | Frank et al. |
| 5,809,522 A | * | 9/1998 | Novak et al. ................ 709/108 |
| 5,860,144 A | | 1/1999 | Frank et al. ................. 711/206 |
| 5,906,001 A | * | 5/1999 | Wu et al. .................... 711/141 |
| 5,956,754 A | * | 9/1999 | Kimmel ...................... 711/206 |
| 6,105,113 A | * | 8/2000 | Schimmel .................... 711/146 |
| 6,119,204 A | * | 9/2000 | Chang et al. ................ 711/141 |

\* cited by examiner

Primary Examiner—B. James Peikari
(74) Attorney, Agent, or Firm—Hamilton, Brook, Smith & Reynolds, P.C.

(57) ABSTRACT

A method for maintaining virtual memory consistency in a multi-processor environment comprises allocating a subset of virtual memory to a process, and mapping the subset of virtual memory to a first subset of physical memory. A translator lookaside buffer (TLB) is maintained in each processor, each TLB comprising a plurality of TLB entries. Each TLB entry represents a mapping between a virtual address in the subset of virtual memory and a physical address in the first subset of physical memory. When the subset of virtual memory is to be unmapped, a reference to the first subset of physical memory is placed into a free list, and marked as dirty. When the number of dirty references exceeds a predetermined threshold, the corresponding entries in each processor's TLB are invalidated. Alternatively, all TLB entries can be invalidated. The free list comprises a plurality of free list entries, where each entry comprises a reference to virtual memory which is either unmapped or whose mapping is dirty.

37 Claims, 17 Drawing Sheets

SYSTEM FOR EFFICIENTLY MAINTAINING TRANSLATION LOCKASIDE BUFFER CONSISTENCY IN A MULTI-THREADED, MULTI-PROCESSOR VIRTUAL MEMORY SYSTEM

RELATED APPLICATIONS

This application is related to application Ser. No. 09/321,809 entitled "System for Extending an Addressable Range of Memory" by Richard Frank, Gopalan Arun, Michael Cusson and Daniel E. O'Shaughnessy, the entire teachings of which are incorporated herein by reference.

BACKGROUND OF THE INVENTION

Modern large computer systems contain memory management hardware and addressing systems to provide software processes ("processes") with access to a defined range of physical memory, e.g., hardware volatile memory. Operating systems within such computer systems provide data structures which define and maintain virtual memory spaces which can be private to each process. A process's virtual memory space is then used transparently by the process to access data that is actually maintained within the physical memory space.

Such data structures provide a mapping between the addresses of the virtual memory space used by the process and the addresses of the physical memory space used by the computer system's hardware memory management system which actually maintains the data in the physical memory. A typical such computer system can provide memory mappings for as many as 500 or more processes simultaneously.

One such data structure is a page table which is itself maintained in the physical memory. A disadvantage resulting from the page table being in physical memory is that each access to it requires costly consumption of bus bandwidth.

To avoid these costly page table accesses, modem CPUs typically have local translation lookaside buffers, or TLBs. A TLB is a relatively small, high-speed memory cache which stores virtual address to physical address mappings close to the CPU. After a mapping is found in the page table, it is copied into the TLB so future accesses to the same virtual address do not require a page table lookup.

In a multi-processor machine, a process may be divided into threads of execution, some threads executing on different CPUs. All of a process's threads share a common virtual address space. Each of the CPUs, however, maintains its own copy of the TLB. When any of the CPUs in the machine invalidates an entry in the TLB, each CPU is notified, traditionally by means of a hardware interrupt, that there has been a change to the TLB and refreshes its copy. Invalidating TLB entries, however, is very expensive, because all of the CPUs on the machine stop their processing to perform the refresh.

SUMMARY

The cost of invalidating TLB entries in a multiprocessor system can be minimized by processing them in batches. Mappings invalidated by any of the processors are marked as dirty and tracked by a driver process. Once the number of dirty mappings exceeds a certain predetermined threshold, the driver batches the mappings together and passes the list of dirty mappings to all of the processors. If a dispatch level routine, which has higher execution priority than ordinary user routines, is used to notify the processors, it is scheduled to execute on all of the processors immediately. On each processor, TLB entries corresponding to the batched dirty mappings are identified and invalidated.

By leveraging database application semantics to memory management, effective and sizable TLB batches can be formed without hindering performance. Because the driver responsible for forming the batch is also the interface for providing the database user processes memory, the identified TLB entries are efficiently invalidated on an on-demand basis.

Accordingly, a method for maintaining virtual memory consistency in a multi-processor environment comprises allocating a subset of virtual memory to a process, and mapping the subset of virtual memory to a first subset of physical memory. A memory mapping mechanism such as a translator lookaside buffer (TLB) is maintained in each processor, each TLB comprising a plurality of TLB entries. Each TLB entry comprises mapping information with respect to a mapping between a virtual address in the subset of virtual memory and a physical address in the first subset of physical memory. When the subset of virtual memory is to be remapped to a different, or second, subset of physical memory, a reference to the first subset of physical memory is placed into a free list, and marked as dirty. When the number of dirty references exceeds a predetermined threshold, the corresponding entries in each processor's TLB are invalidated. Alternatively, all TLB entries can be invalidated.

In accordance with certain embodiments, a subset of virtual memory is allocated to a process, and mapped to a first subset of physical memory. Memory mappings which should be invalidated according to some algorithm such as a Least Recently Used (LRU) algorithm, are identified. When the number of identified memory mappings equals or exceeds a predetermined threshold, a list of the identified memory mappings is accessed by each processor, and at each processor, TLB entries corresponding to the identified memory mappings are batched together and invalidated. The list can be maintained by the same driver process which provides memory for database user processes. Each processor is notified, via a dispatch-level routine, for example, to invalidate the batched TLB entries.

TLB entries can be invalidated at an essentially regular interval, for example, at about once every second. This can be accomplished by triggering invalidation of the TLB entries when the number of dirty mappings exceeds a predetermined threshold, such as 2000, where it is known that mappings occur at a reasonably regular rate. The particular threshold number, however, is dependent on particulars of the computing system.

In accordance with certain embodiments, the system also maintains a free list which includes a plurality of free list entries. Each free list entry includes a reference to virtual memory which is either unmapped or whose mapping is marked as dirty. The free list entries marked as dirty can be tracked, for example, in a hash table. Upon determining that a mapping referenced by a dirty free list entry is needed by a particular processor, the dirty entry can be removed from the free list.

The system can further maintain a page table which includes a plurality of page table entries (PTEs). Each PTE includes a mapping from a virtual address to a physical address. When a process thread executing on a processor accesses a virtual address, the processor first searches the virtual address in the processor's respective TLB. If no valid TLB entry holds a mapping for the virtual address, the processor can search the page table for the virtual address. Upon finding a valid mapping in the page table for the virtual address, the processor can copy the mapping to the processor's TLB.

BRIEF DESCRIPTION OF THE DRAWINGS

The foregoing and other objects, features and advantages of the invention will be apparent from the following more particular description of preferred embodiments of a system for efficiently maintaining virtual memory consistency, as illustrated in the accompanying drawings in which like reference characters refer to the same parts throughout the different views. For clarity of understanding, the drawings are not necessarily to scale, emphasis instead being placed upon illustrating the principles of the invention.

DETAILED DESCRIPTION

Figure 1:
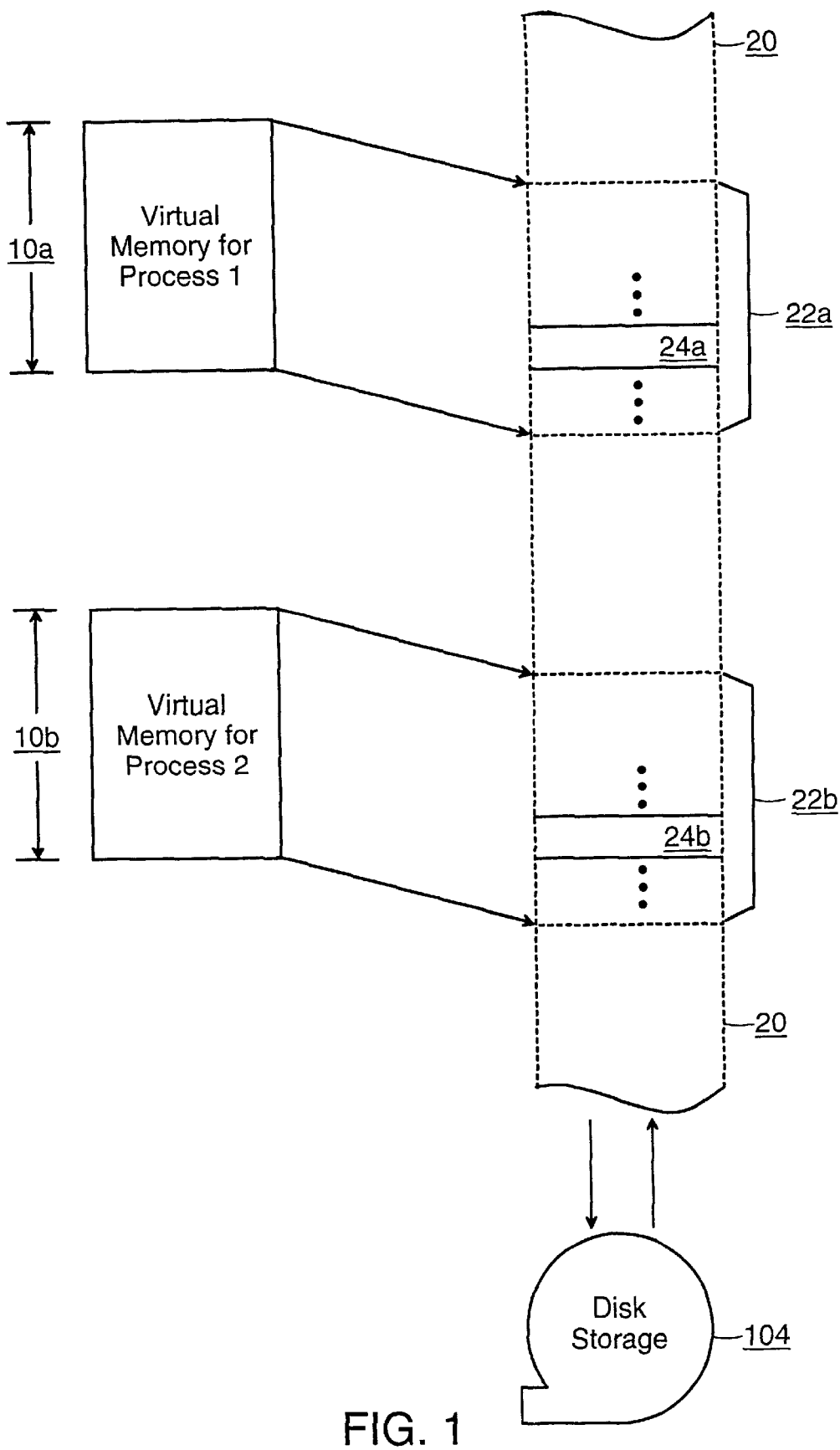
FIG. 1 is a schematic diagram illustrating a memory addressing mechanism used in typical virtual memory centric based systems.

FIG. 1 is a schematic diagram illustrating a memory addressing mechanism used in typical virtual memory centric based systems. Two virtual address memory spaces are shown as 10a and 10b for process 1 and process 2, respectively. Also shown is a large physical memory address space 20. Within a typical 32-bit operating system, the allowed size of each virtual memory space 10a and 10b is approximately 2 gigabytes (Gb), with another 2 Gb of memory space being reserved for the operating system.

The operating system allocates a subset, or working set, of physical memory to each virtual address space 10a, 10b. Working set 22a is allocated for virtual memory space 10a and working set 22b is allocated for virtual memory space 10b. In a 32-bit operating system, the typical size allowed for a given working set is about 10–20 megabytes (Mb), however, in some database applications a maximum of 0.25 Gb can be reserved.

A working set is divided into pages of physical memory, e.g., one page 24a is shown for working set 22a and one page 24b is shown for working set 22b. The size of a page is programmable, but one typical size is 8 kilobytes (Kb).

When a process accesses data, it uses addresses within its virtual address space which are converted by a page table data structure into addresses within the process's working set within the physical memory space 20. The operating system uses the page tables of each process to map pages of physical memory space 20 into the virtual address space (10a, 10b) that the process can access.

Figure 2:
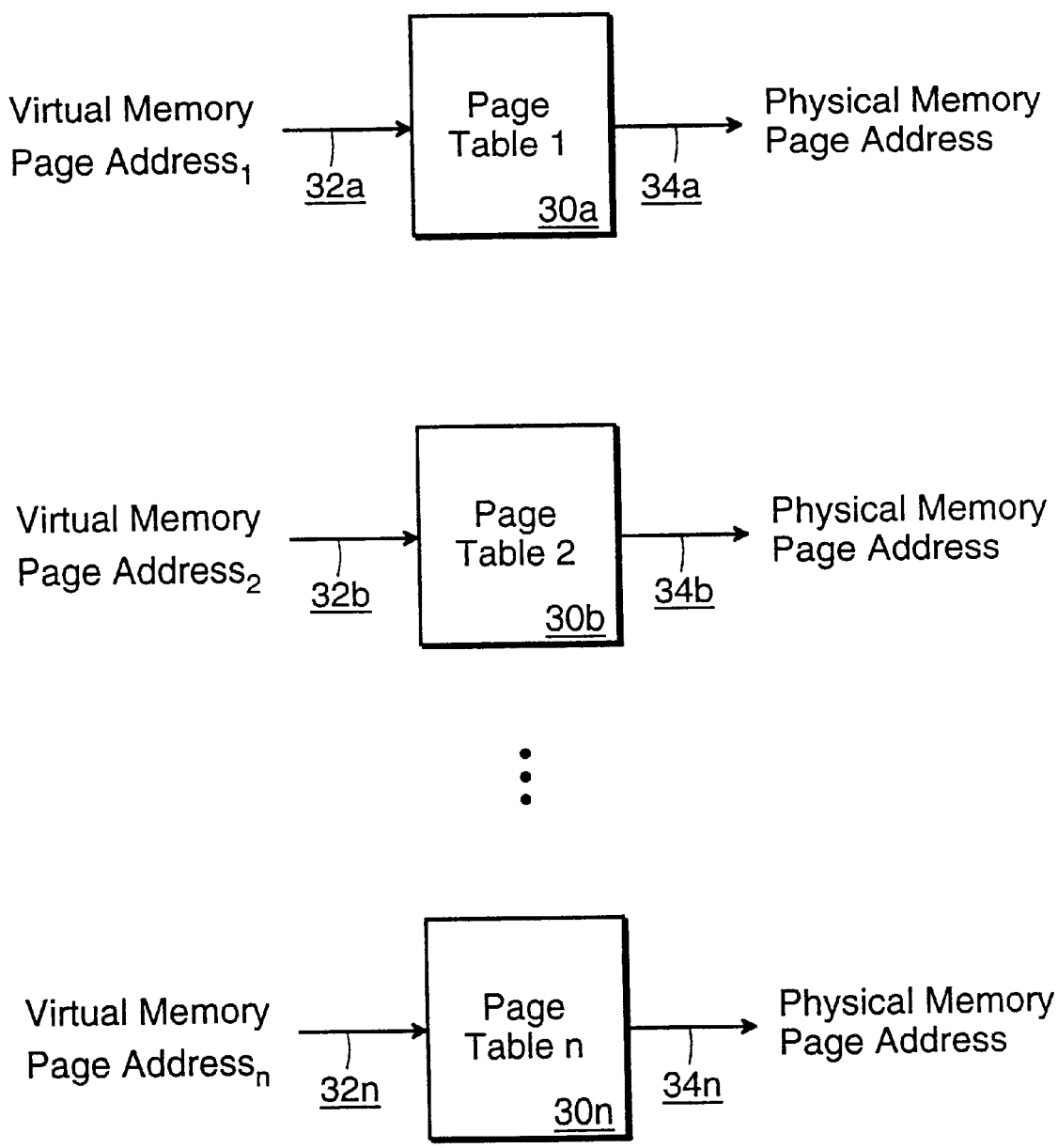
FIG. 2 is a block diagram illustrating page tables used in typical virtual memory entric memory addressing mechanism.

FIG. 2 is a block diagram illustrating page tables used in typical virtual memory centric memory addressing mechanism. Three exemplary page tables 30a, 30b and 30n for process 1, process 2, and process n, are stored in the operating system's address space and maintain mappings between a process's virtual addresses and the addresses of pages within the physical memory space 20. For each process, virtual addresses are received, e.g., over lines 32a, 32b, and 32n, and the appropriate physical page addresses are output by the tables, e.g., over lines 34a, 34b, and 34n. Since many processes can operate simultaneously, e.g., 500 or more, many page tables can be simultaneously accessed and need to be simultaneously maintained.

Because page tables are typically stored in main memory, page table accesses utilize the relatively slow system bus, tying up the bus. Small, fast memory caches within the processors, commonly referred to as translator lookaside buffers, or TLBs, have been developed such that the first time a memory mapping is accessed from the page table, the mapping information is copied to some entry in the TLB. Because the TLB is typically much smaller than a page table and cannot hold every mapping, some algorithm such as a Least Recently Used (LRU) algorithm is used to identify which TLB entries to invalidate when new mappings must be stored and there are no empty entries available.

Figure 3:
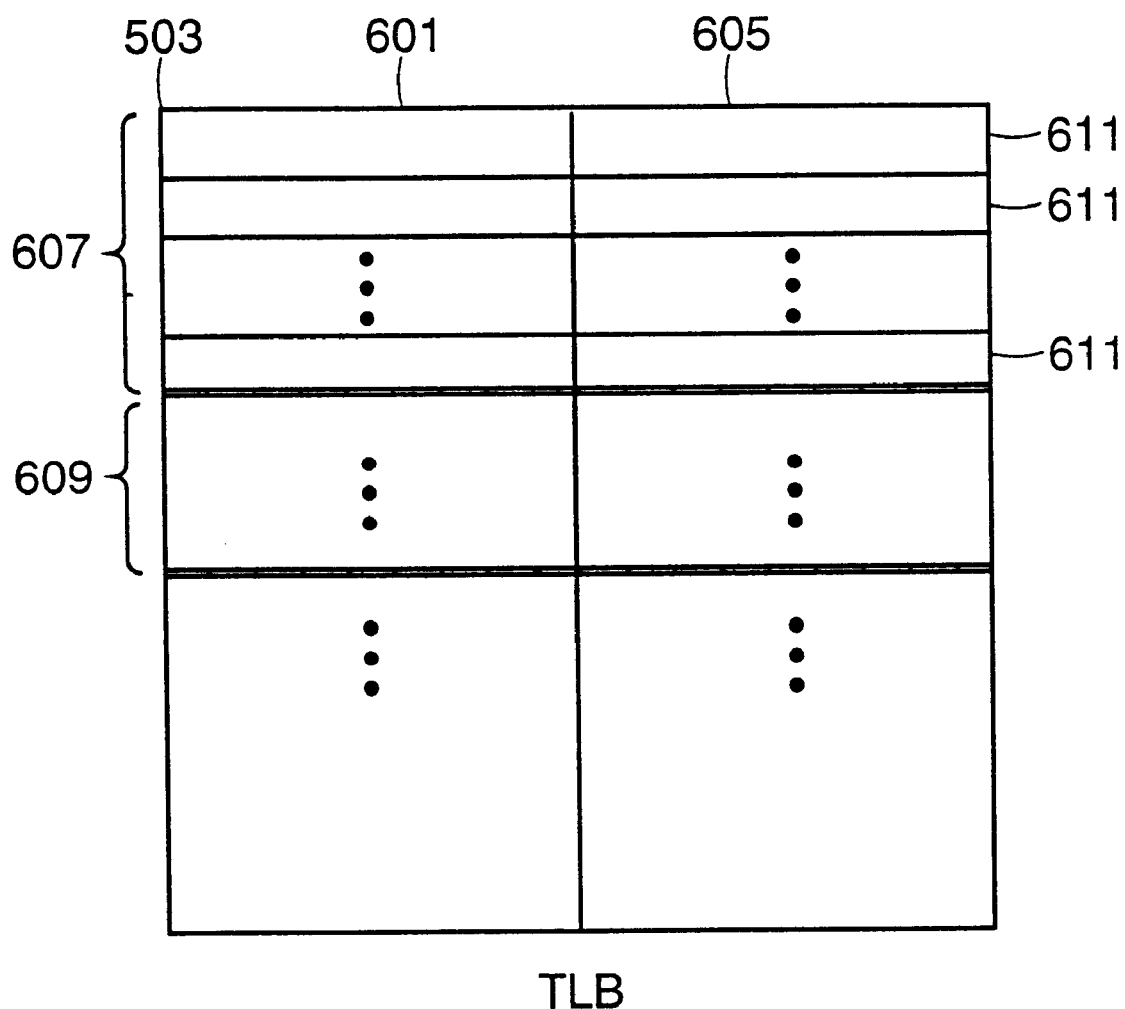
FIG. 3 is a schematic diagram illustrating a translator lookaside buffer (TLB).

FIG. 3 is a schematic diagram illustrating a translator lookaside buffer (TLB) 503. While there are different types of TLBs in use, most notably direct mapping, associative mapping and set-associative mapping TLBs, any type of TLB can be used. For illustrative purposes, an associative TLB, which is a content-addressable memory, is portrayed. Each entry 611 has at least two fields, representing a memory mapping: a virtual address field 601, used as a key for searching the TLB; and a physical address field 603.

Where multiple processes run on a processor, a TLB 503 can be divided into sections, e.g., 607, 609. Each section is associated with a different process, so that only the section associated with current process is relevant. For illustrative purposes, we refer to the whole TLB, but it will be understood that only that part of the TLB associated with the current process is affected.

Figure 4:
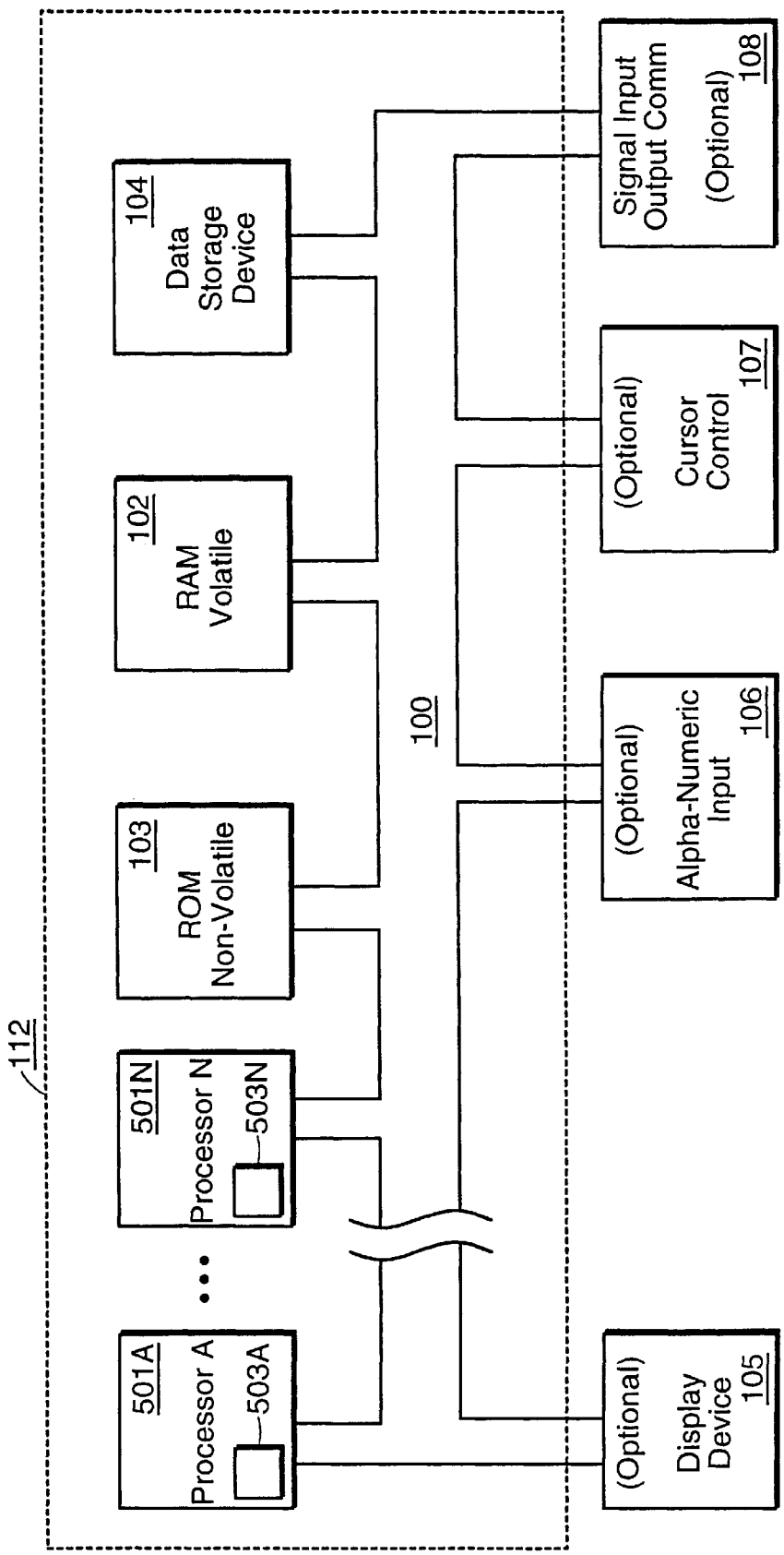
FIG. 4 is a block diagram illustrating an embodiment of a multi-processor computer system.

FIG. 4 is a block diagram of a multi-processor computer system 112. In general, a computer system 112 used by the present invention comprises one or more processors 501A–501N for processing information and instructions, a computer readable volatile main memory unit 102, and a computer readable non-volatile memory unit, all able to communicate with each other over an address/data bus 100. Each processor has its own translation lookaside buffer (TLB) 503A–503N respectively. System 112 also includes a mass storage computer readable data storage device 104 such as a magnetic or optical disk and disk drive coupled with the bus 100 for storing information and instructions.

Optionally, system 112 can include a display device 105 coupled to the bus 100 for displaying information to the computer user, an alphanumeric input device 106 including alphanumeric and function keys coupled to the bus 100 for communicating information and command selections to the processors 501A–501N, a cursor control device 107 coupled to the bus for communicating user input information and command selections to the processors 501A–501N, and a signal generating device 108 coupled to the bus 100 for communicating command selections to the processors 501A–501N.

In a multi-processor system, a process may be split into multiple threads of execution, which, while accessing a common virtual address space, may execute on different processors. Where each processor has its own copy of the TLB, maintaining consistency among the multiple TLBs becomes a difficult problem. Typically if one processor invalidates a TLB entry, all of the TLBs must also do so immediately. This requires frequent interrupting to all of the processors, cutting into execution times for all.

To maximize system performance, database software and systems executing database software require access to very large memory (VLM) caches. On existing 16-bit and 32-bit operating systems, these VLM caches are limited by the maximum virtual address space recognized by the operating system, which can be at most 4 Gb, and is usually much less (e.g., 2 Gb).

U.S. Pat. No. 5,860,144 (the '144 patent), assigned to Oracle Corp., and incorporated herein by reference in its entirety, disclosed a virtual window addressing system that can provide a particular process with access to more physical memory space than 0.25 Gb without requiring disk I/O operations during paging.

Figure 5:
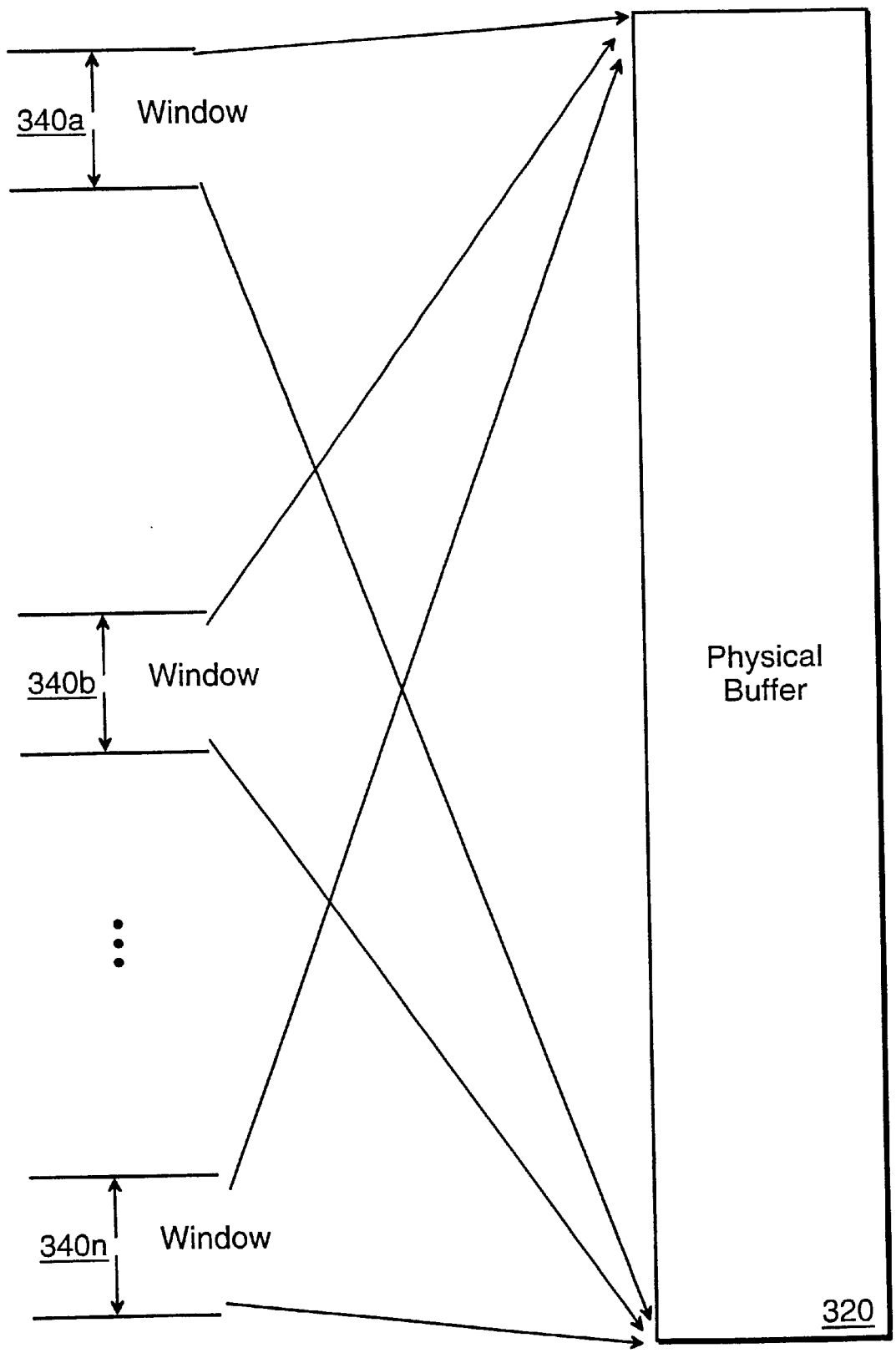
FIG. 5 is a schematic diagram illustrating exemplary virtual windows mapped to the physical memory buffer within an embodiment of an addressing system.

FIG. 5 is a schematic diagram illustrating exemplary virtual windows mapped to the physical memory buffer 320 within an embodiment of an addressing system. As shown, virtual windows 340a, 340b and 340n for processes 1, 2, and n, respectively, can each map to and have access to the entire physical buffer 320. However, only a small amount of the physical buffer 320 can be mapped to a virtual window at any given time. Each process has only a relatively small amount of virtual memory within its virtual window (e.g., approximately 2 Mb) with which to access the information of the physical memory buffer 320. As more database records or other information are required within a virtual window, they are mapped from the physical buffer into the virtual window. Since the mapping operations disclosed in the '144 patent do not require disk I/O (as the paging operations of the prior art require), they occur very rapidly, providing a performance advantage over the prior art.

However, when the system disclosed in the '144 patent is implemented in a multi-processor system, the problem of maintaining consistency among many TLBs becomes even more pronounced, because the frequent remapping of records within the window requires frequent TLB entry invalidation.

The operation of a preferred embodiment is described with reference to the flowcharts of FIGS. 6–9 and the block diagrams of FIGS. 10A–10H.

Figure 10A:
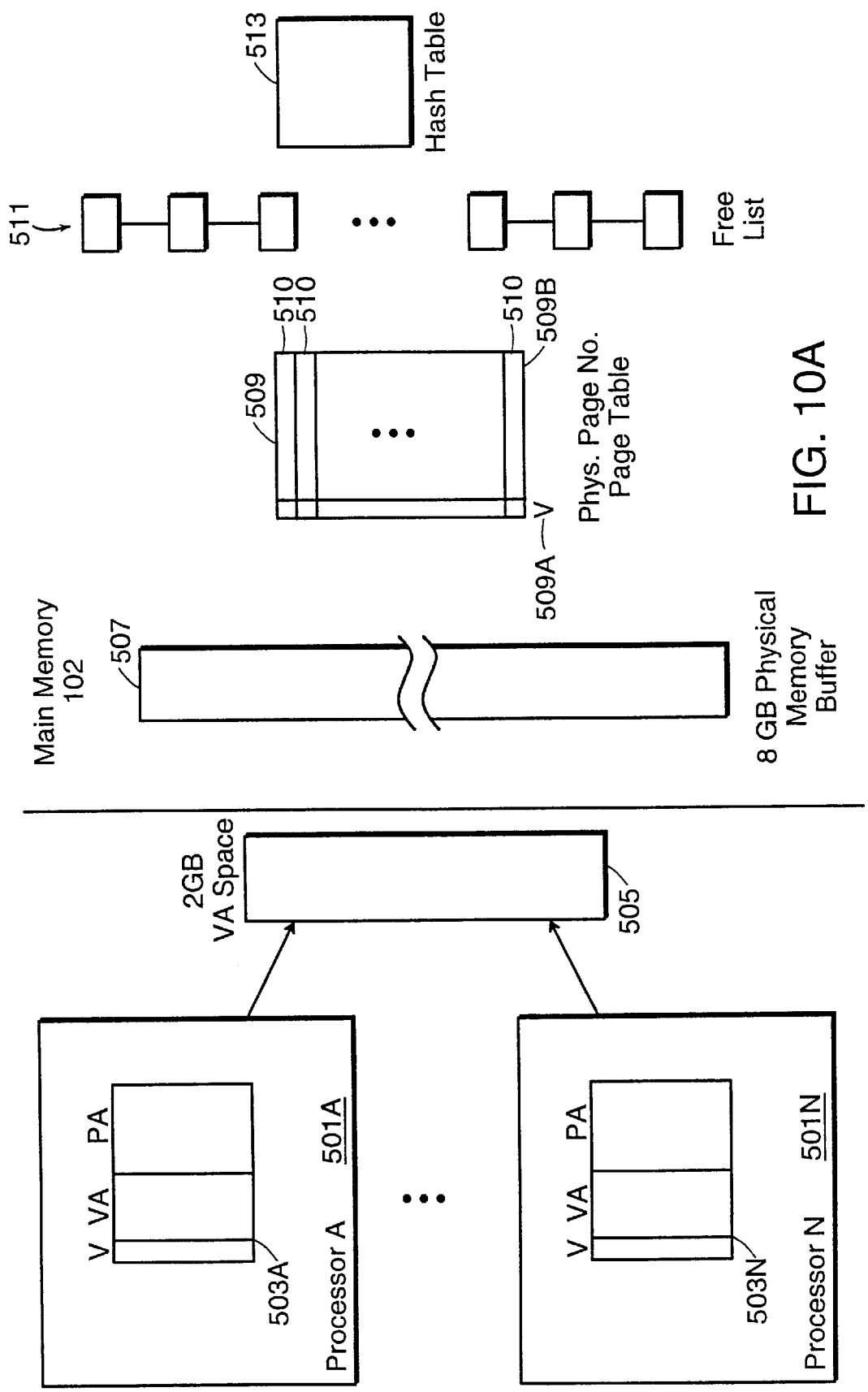
FIGS. 10A, 10B, 10C, 10D, 10E, 10F, 10G and 10H are block diagrams illustrating various steps taken by the present invention in an exemplary multi-processor system.

FIG. 10A is a block diagram depicting a preferred N-processor embodiment. A translation lookaside buffer or TLB 503A–503N, is associated with each processor 501A–501N, respectively.

A virtual address space 505 is common to each thread of a process, regardless of which processor the thread executes on. Main memory 102 holds physical memory buffers when they are allocated, such as physical memory buffer 507, as well as a process's page table 509, free list 511 and hash table 513. The page table 509 comprises a plurality of page table entries, or PTEs 510, one for each physical page in the physical memory buffer 507, and is indexed by a virtual address. Each PTE has a valid field 509A which indicates whether the PTE is valid, and a physical page number field 509B which holds the physical page number mapped to that virtual address. A PTE may comprise other fields as well, such as, for example, permission fields.

Figure 6:
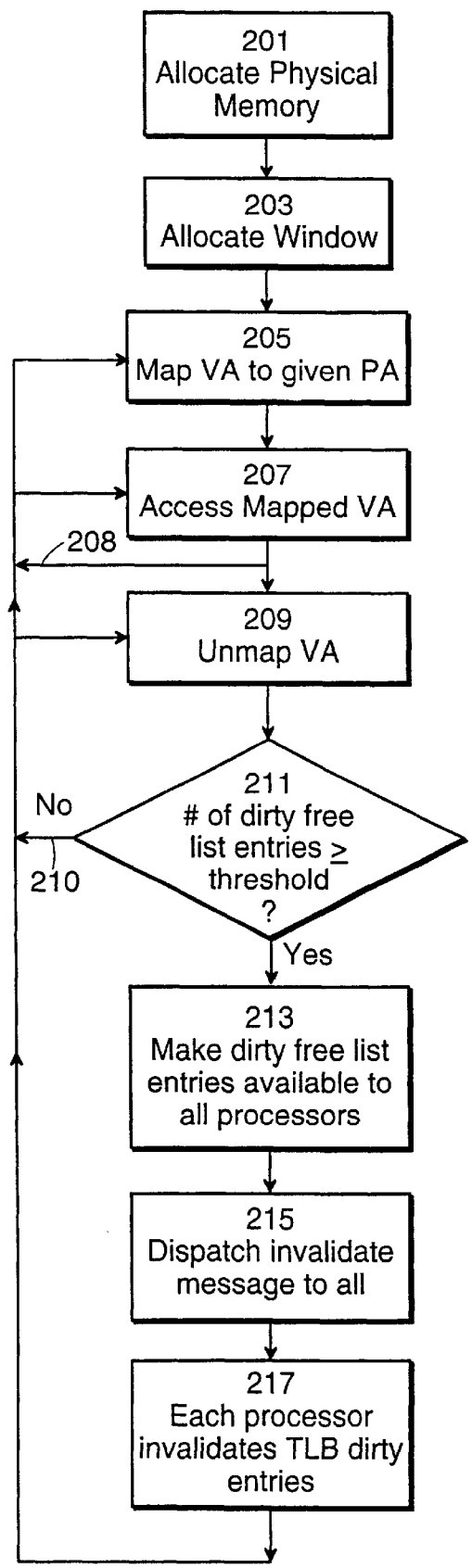
FIG. 6 is a flowchart showing the general order in which memory mapping and accessing events take place in a single processor of the multi-processor system of FIG. 3.

FIG. 6 is a flowchart showing the general order in which memory mapping and accessing events take place in a single processor of the multi-processor system of FIG. 4. Initially, when a process is created, each TLB 503A–503N is empty and no physical memory buffer 507 is allocated to the process. Eventually, a physical buffer is requested, as in Step 201 of FIG. 6, resulting in the allocation of physical memory to a physical memory buffer 507 (FIG. 10A). Data is then preferably loaded into the physical memory buffer 507 from, for example, disk storage 104. The page table 509 is initialized such that all of its PTEs are invalid. Each processor's TLB 503A–503N is likewise initialized.

Figure 10B:
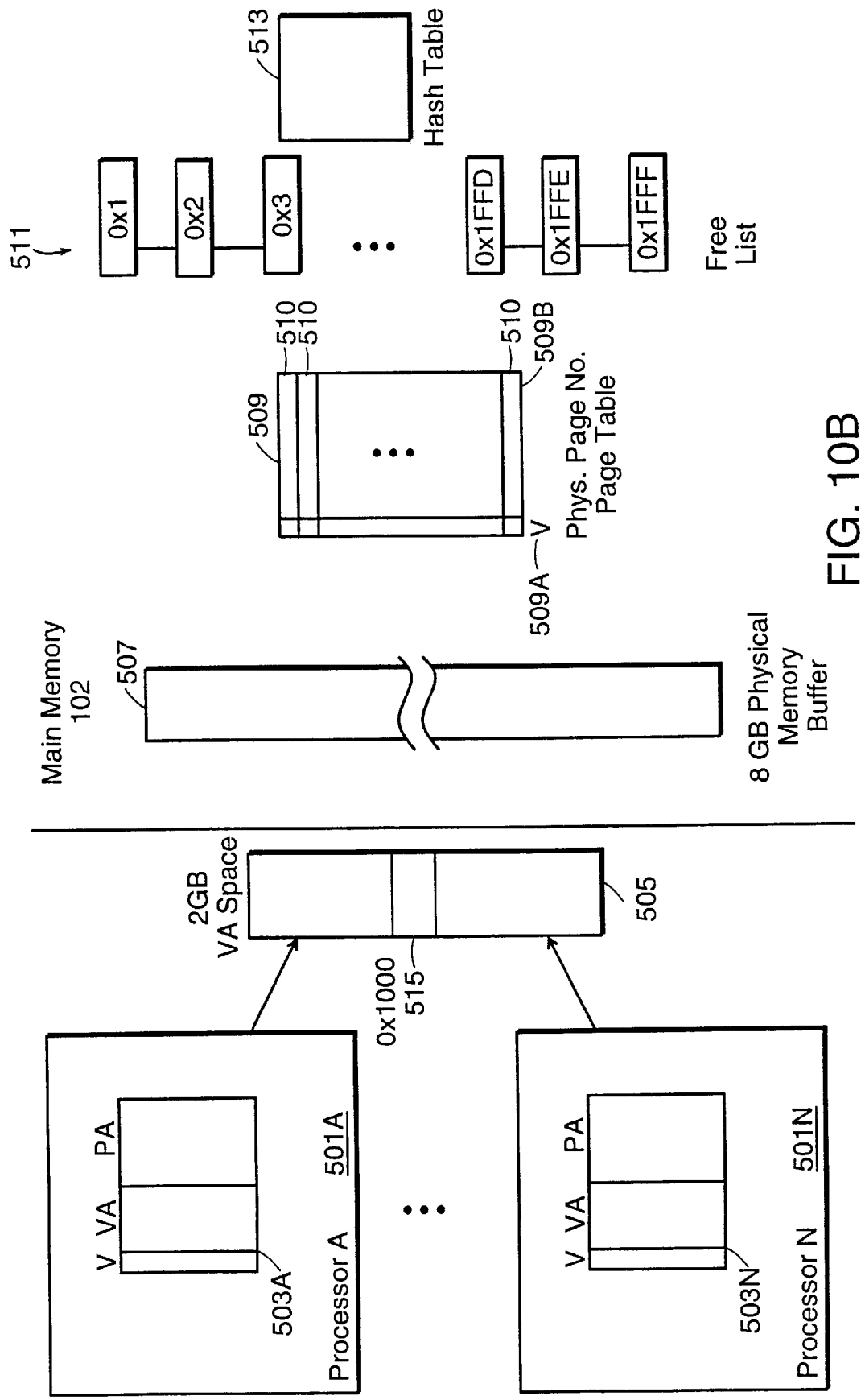
Figure 10C:
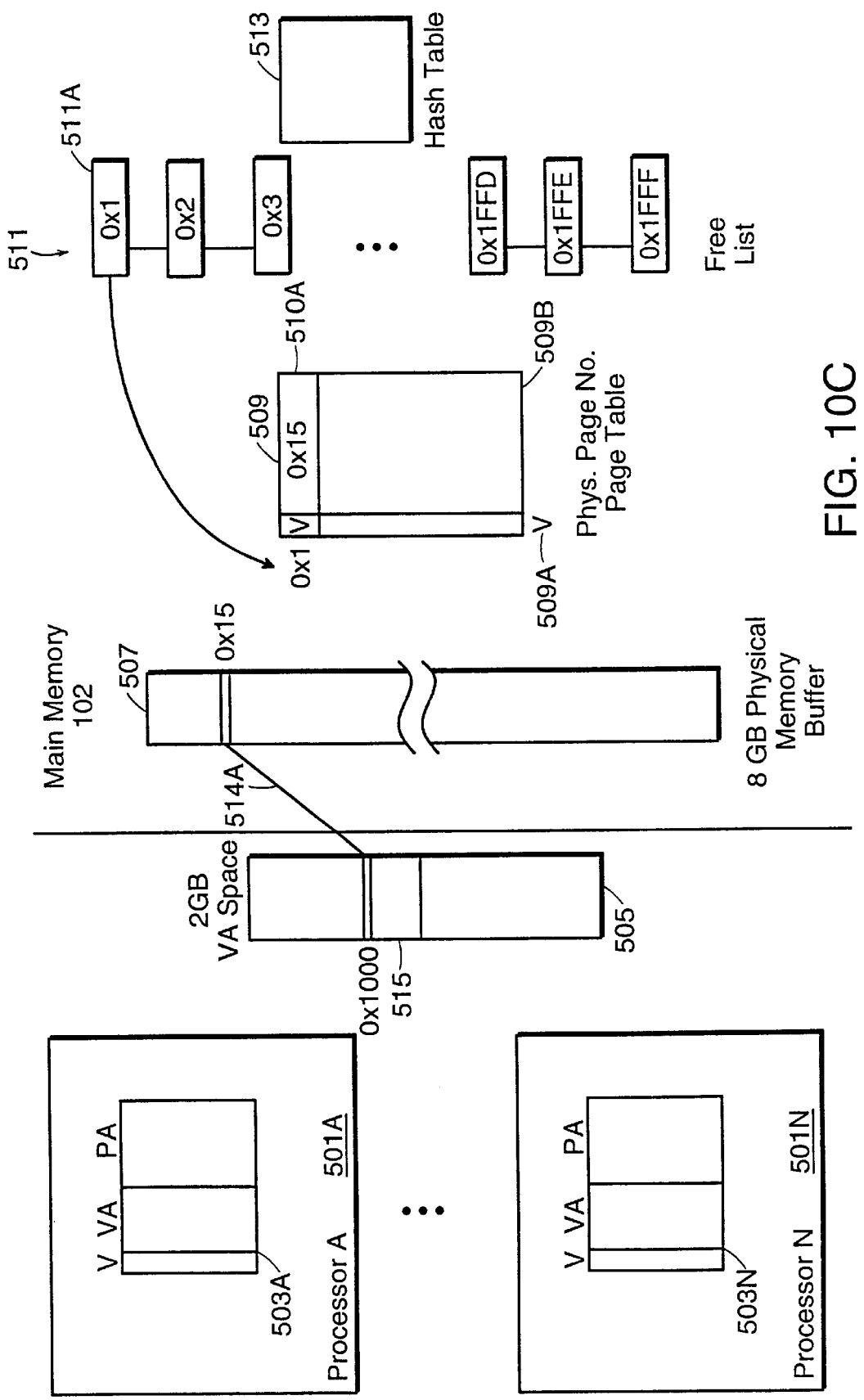
Figure 10D:
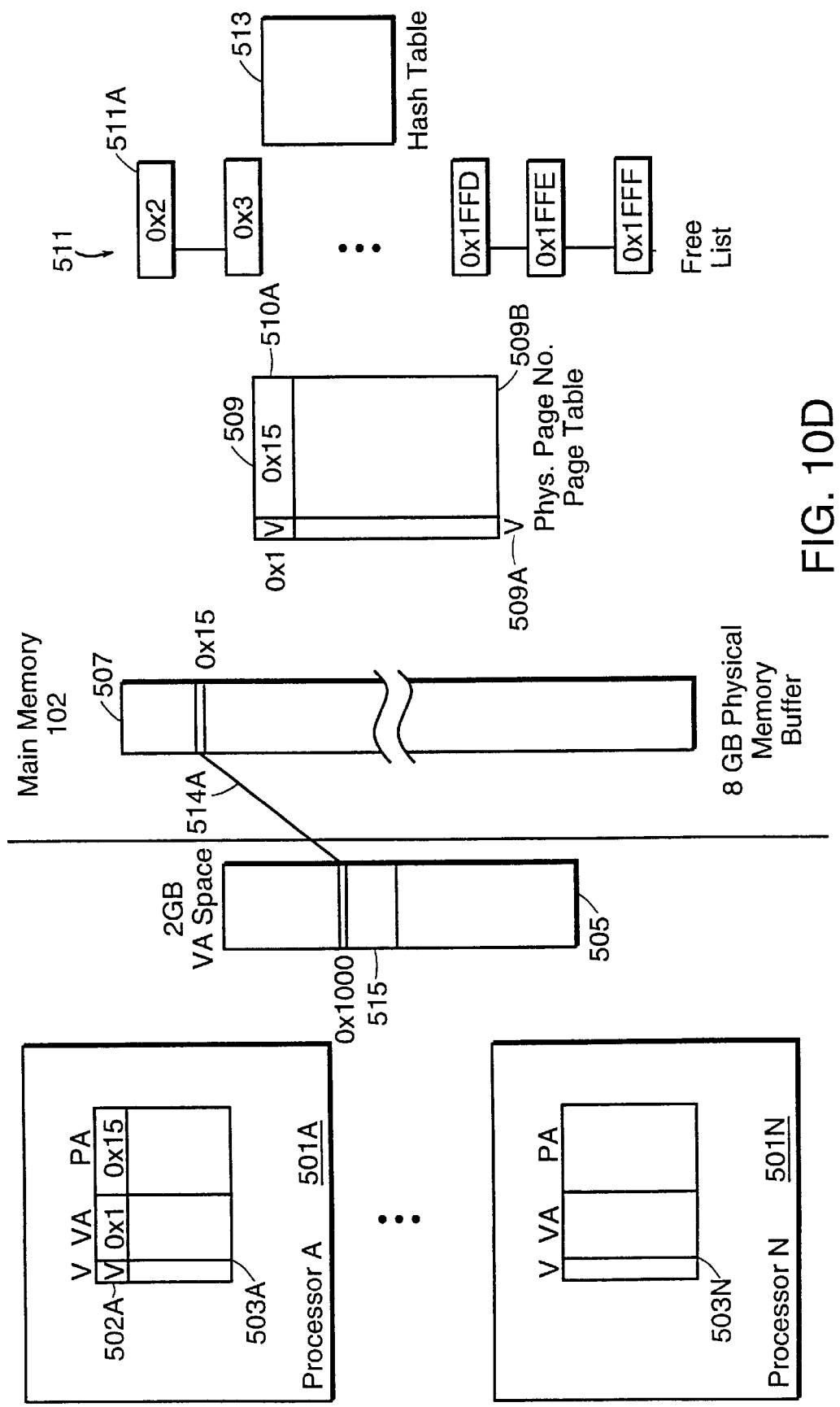

Next, a window is requested, as in Step 203 (FIG. 6), resulting in the allocation of a subset of virtual address space to the requested window, preferably according to the technique disclosed in U.S. Pat. No. 5,860,144. FIG. 10B shows that a window 515 has been allocated in virtual memory at, for example, address 0x1000. At the same time, the free list 511 is initialized such that each free list entry references a unique page in the window 515. One skilled in the art will recognize that the steps represented in the flowchart of FIG. 6 need not follow each other immediately. That is, one or more instructions may be executed between the blocks shown.

When the process needs to access particular data within the physical memory buffer 507, such as a specific database record, it first requests a mapping to the corresponding physical address, as in step 205 of FIG. 6. For example, in FIG. 10C, the process, which needs to access data in physical page 0x15, has requested a mapping to physical page 0x15. The head entry 511A of the free list is removed from the free list 511, and the virtual address page to which it refers, here 0x1, is mapped to physical page 0x15. The mapping is accomplished by writing the physical page number 0x15 into the page table entry (PTE) 510A indexed by the virtual address page number, here 0x1, and setting PTE 510A's valid flag to indicate it is valid. Line 514A illustrates the mapping between virtual address-page 0x1 in the window 515 and the physical page 0x15.

Eventually, the process attempts to access a mapped virtual address, as in Step 207 (FIG. 6), for example, virtual address 0x1000. The process thread first searches the TLB of the processor on which it is executing using the virtual address page number 0x1. In the current example, the thread is executing on Processor A. Processor A's TLB 503A is empty, i.e., it has no valid entries. Next, the process uses the virtual address page number 0x1 to point to a PTE 510A in the page table 507. Because the page has previously been mapped (Step 205), a valid PTE 510A is found, and the mapping of virtual address page 0x1 to physical page 0x15 is entered into Processor A's TLB 503A, shown in FIG. 10D as reference 502A. At the same time, the process accesses the desired location through virtual address 0x1000. In subsequent accesses to virtual address 0x1000, the process thread executing on Processor A will find the mapping 502A in its TLB 503A, thus avoiding the large expense of retrieving it from the page table 507.

Step 207 (FIG. 6) is discussed in more detail below with respect to FIG. 8.

Figure 10E:
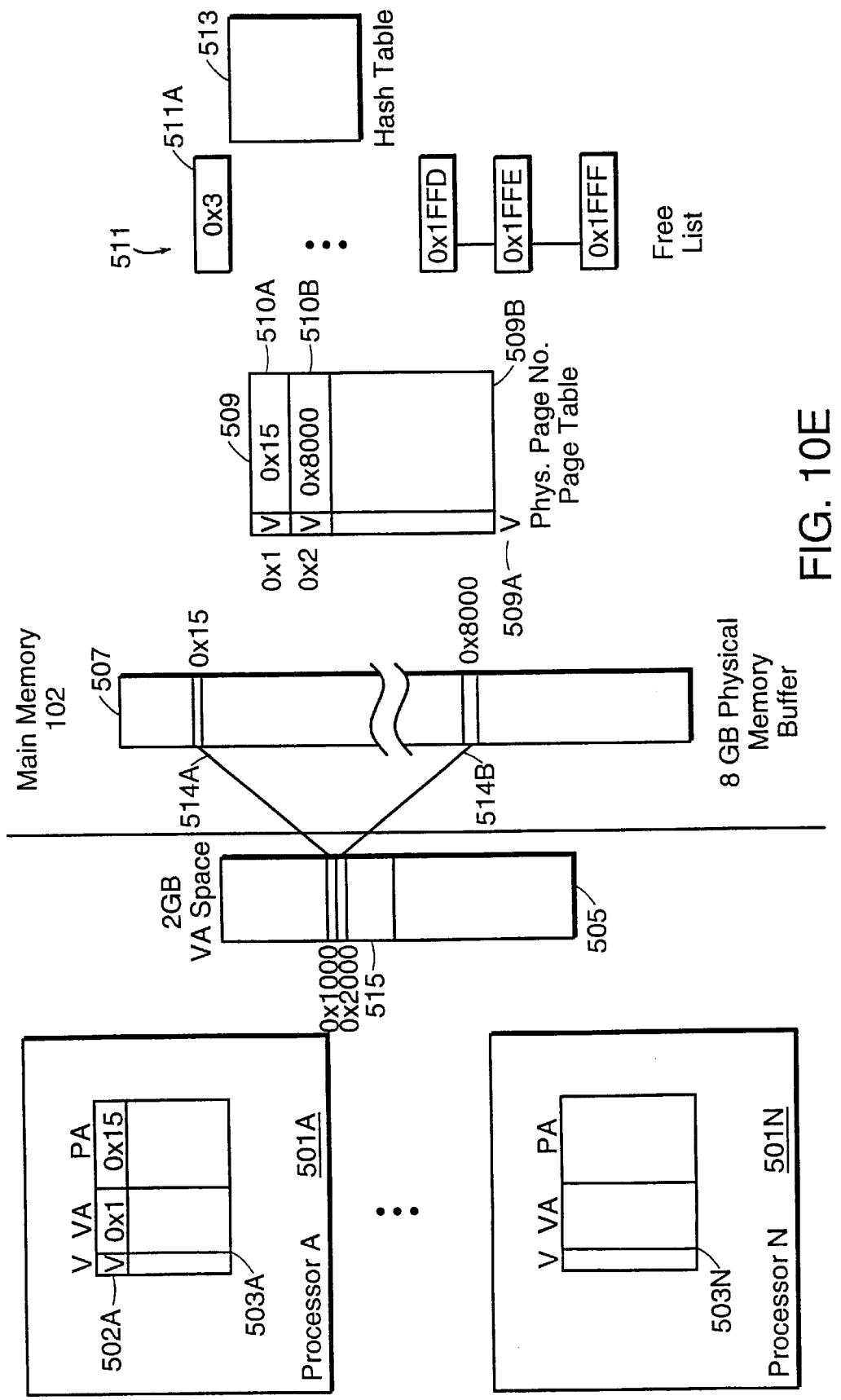

As indicated by line 208 (FIG. 6), among other operations, additional virtual addresses may be mapped (step 205) and accessed (step 207). For example, as illustrated in FIG. 10E, Processor A's thread has requested a mapping to physical page number 0x8000. The same procedure as discussed above is followed. The current head 511A (FIG. 10D) of the free list 511 is removed and physical page number 0x8000 mapped to the referenced virtual address page, here 0x2. A valid PTE 510B is created for the new mapping, which is shown as line 514B.

Figure 10F:
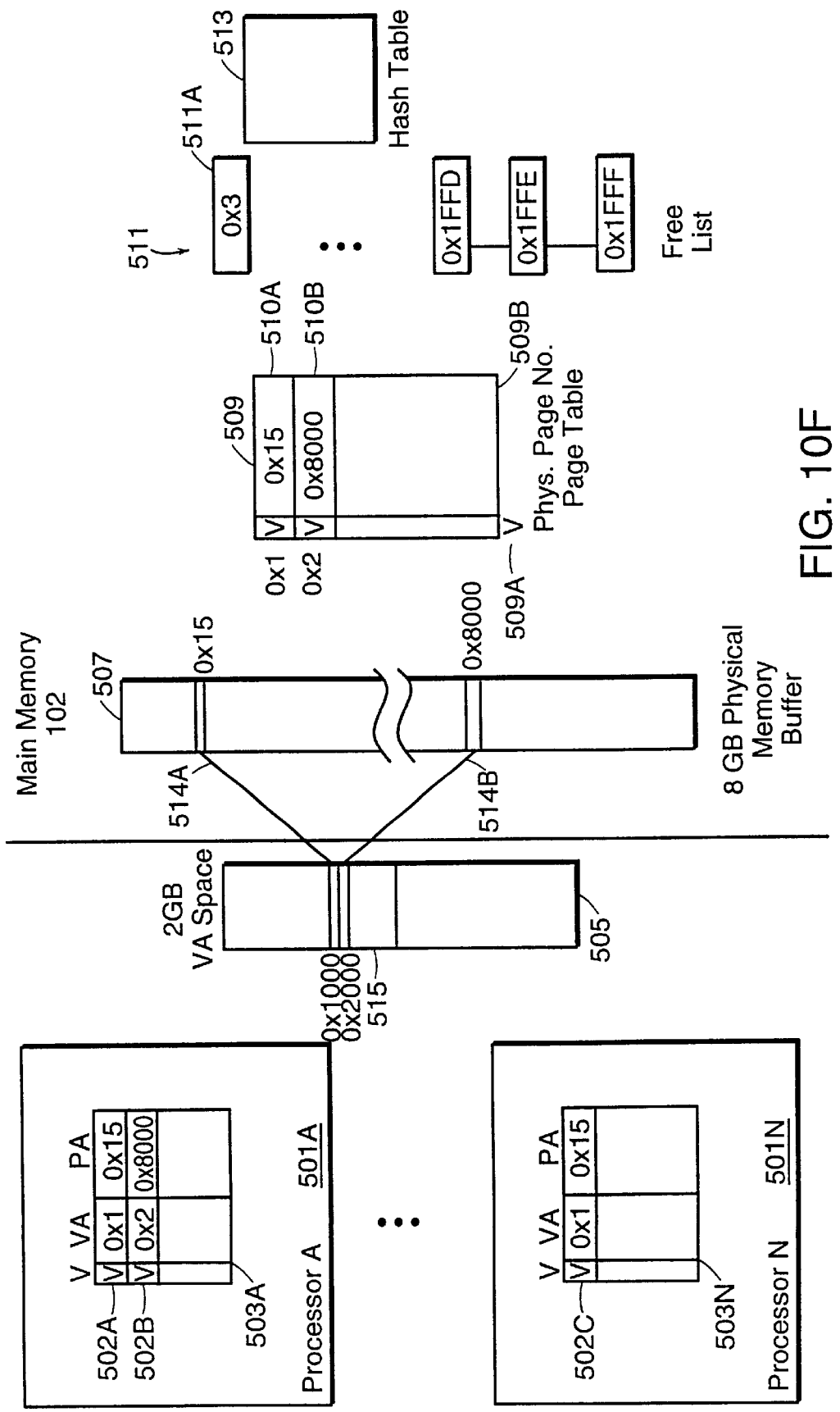

When Processor A's thread attempts to access this newly mapped location, it must, as above, first search the page table. After retrieving the mapping, the mapping is placed in Processor A's TLB as entry 502B, as shown in FIG. 10F.

Now, suppose that a separate thread of the process, executing in Processor N, attempts to access virtual address 0x1000. In similar fashion to that described above, it first searches its respective TLB 503N for a valid entry corresponding to virtual address page 0x1. Not finding such an entry, Processor N retrieves the mapping 510A from the page table 509 and creates a corresponding entry 502C in its TLB 503N. Now, Processors A and N each have a valid TLB entry, 502A and 502C respectively, mapping virtual address page 0x1 to physical page number 0x15.

Figure 10G:
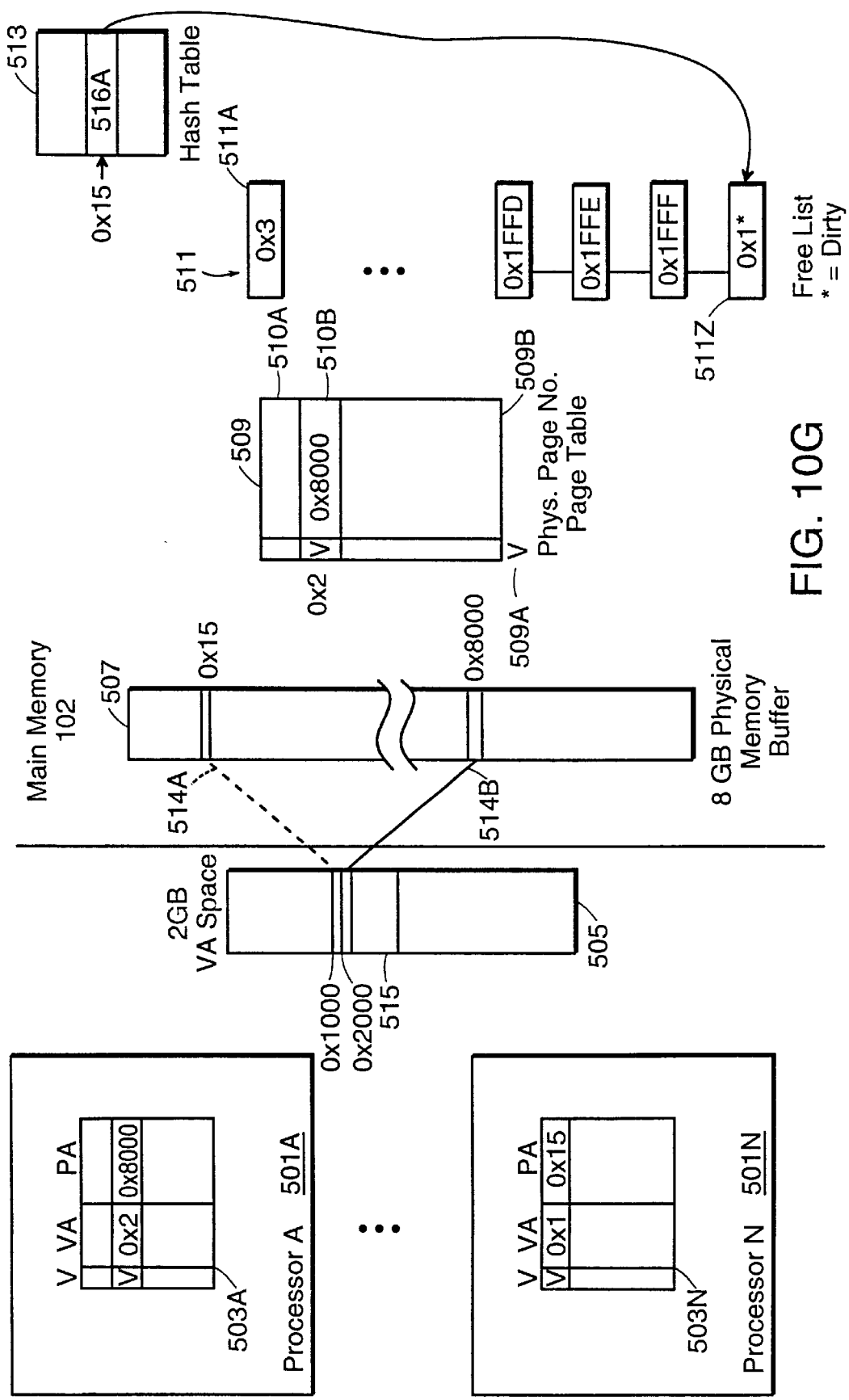

Eventually, the process may no longer need a particular record or data, and may request that the data be unmapped, as in Step 209 of FIG. 6. As FIG. 10G illustrates, the corresponding TLB entry 502A is invalidated, as is the corresponding page table entry 510A. The virtual address page 0x1 is placed onto the tail of the free list 511 at 511Z and marked as dirty, as indicated by the asterisk (*). In addition, an entry 516A is placed in the hash table 513 pointing to this free list entry 511Z. The hash table 513, indexed by a hash of a physical page number, holds pointers to each dirty entry in the free list 511. For example, physical page number 0x15 references hash table entry 516A, which in turn points to dirty free list entry 511Z.

Note that although the mapping has been invalidated in Processor A's TLB 503A and the page table 509, Processor N's TLB 503N still holds a valid mapping 502C of virtual address page 0x1 to physical page 0x15. This mapping can be used by Processor N without consequence.

Step 209 (FIG. 6) is discussed in more detail below with respect to FIG. 9.

Figure 10H:
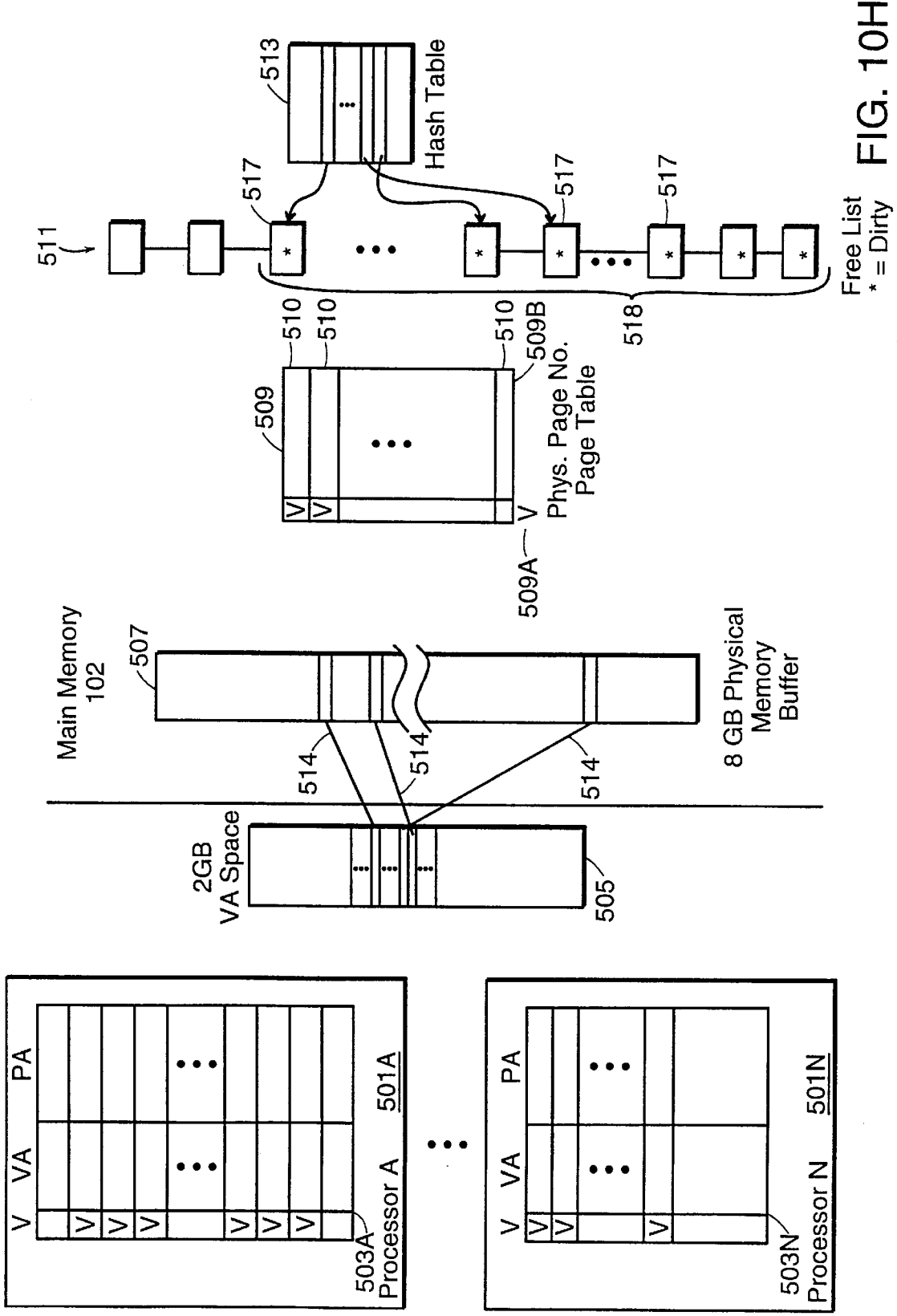

Many more virtual addresses may be mapped (Step 205), accessed (Step 207) and unmapped (Step 209) according to the program executed within the process. FIG. 10H illustrates a possible snapshot of the system at a later time. Processor A's TLB 503A holds many valid entries, as does Processor N's TLB 503N. Other processors, not shown, may also have a plurality of valid entries in their respective TLBs. In addition, each TLB may contain valid entries whose corresponding mappings in the page table may have been invalidated by another thread executing in another processor, as described above. The page table 509 now holds many valid mappings, a sampling of which are illustrated between the virtual address space 505 and physical memory buffer 507 as references 514. The free list now contains many dirty entries 517, marked with asterisks, each referenced by an entry in the hash table 513.

During the operation of mapping a virtual address (Step 205), if a valid mapping is not found in the specific processor's TLB, and is not found in the page table, the hash table 513 is examined. If the hash table contains a valid entry for the virtual address, the free list entry which is pointed to by the hash table entry (and which should be marked as dirty) is removed from the free list and the virtual address is remapped in the page table to the respective physical page number. The hash table entry is then removed or invalidated.

Eventually the number of dirty entries may exceed a predetermined threshold, as determined at Step 211 of FIG. 6. When this threshold is exceeded, Step 213 follows. The list 518 of dirty entries in the free list 511 is made available to each processor and, at Step 215, a dispatch routine sends an invalidate message to each processor. At Step 217, each processor invalidates in its TLB any entries corresponding to the dirty free list entries. Preferably, all of the processors perform this invalidation in parallel. The free list entries are then unmarked, i.e., they are no longer dirty, and the hash table 513 is cleared.

Thus, all of the stale entries for each processor's TLB have been batched together and invalidated together, rather than invalidating each entry in each processor upon each unmapping.

Figure 7:
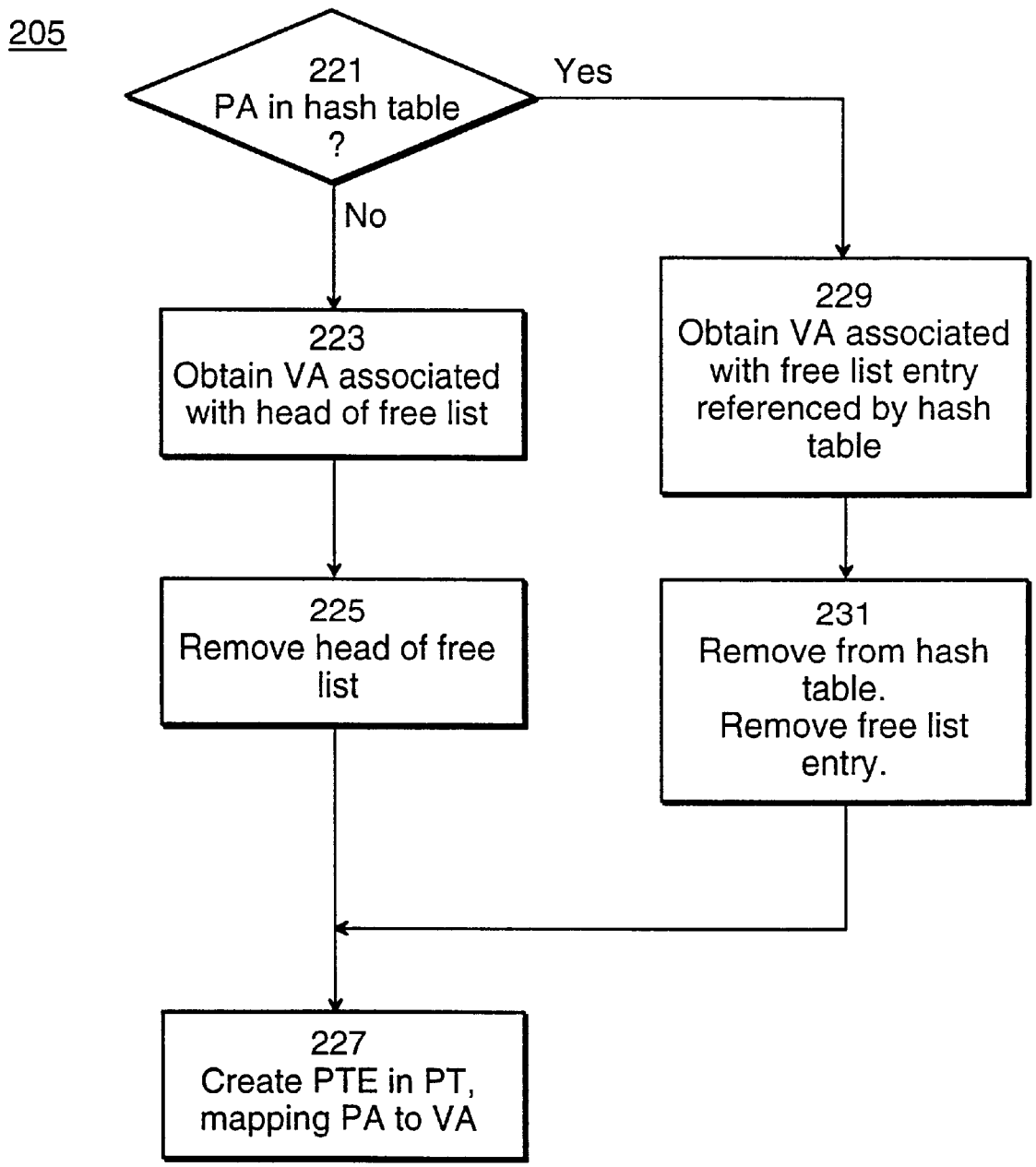
FIG. 7 is a detailed flowchart of the mapping step of FIG. 6.
Figure 8:
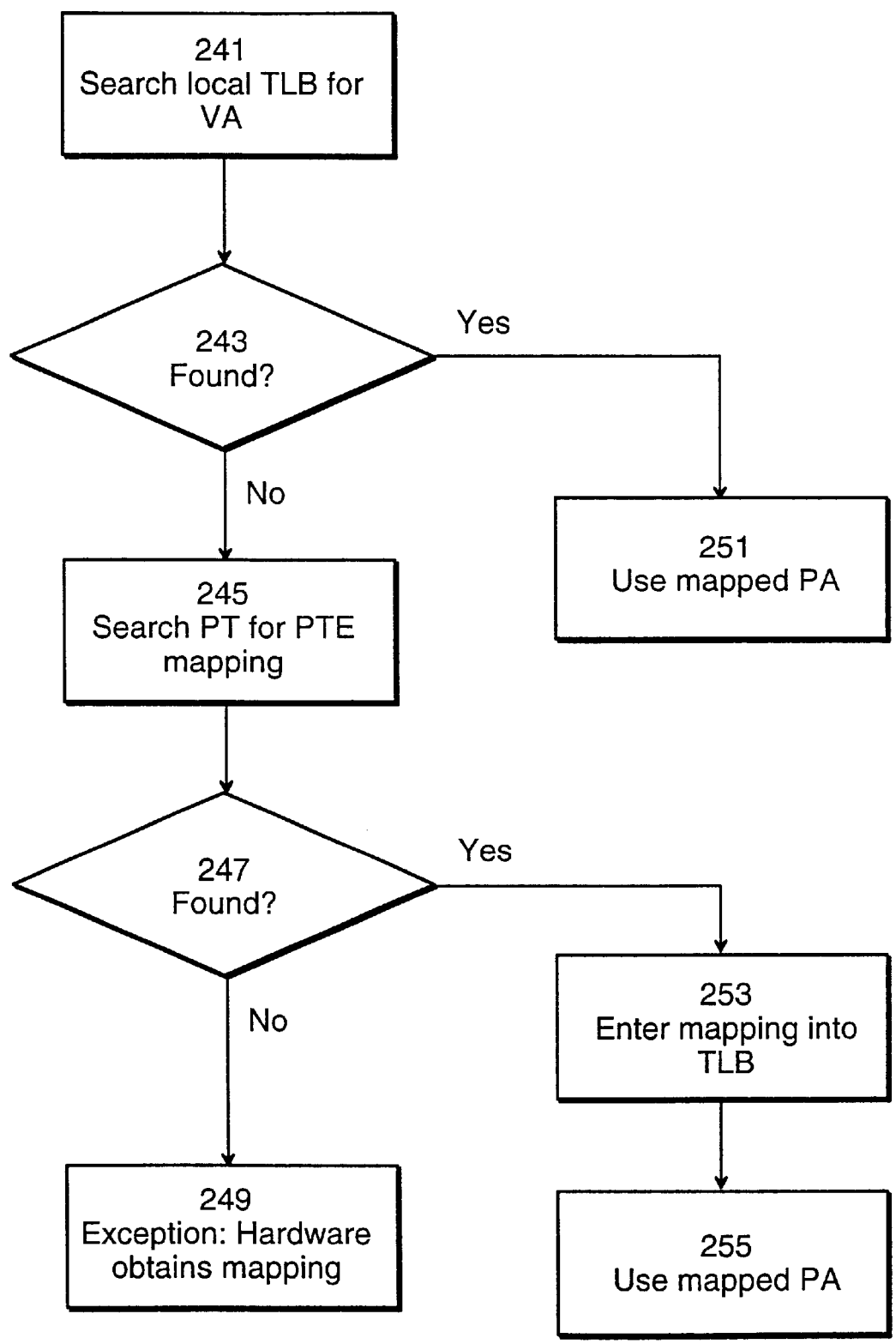
FIG. 8 is a detailed flowchart of the memory access step of FIG. 6.
Figure 9:
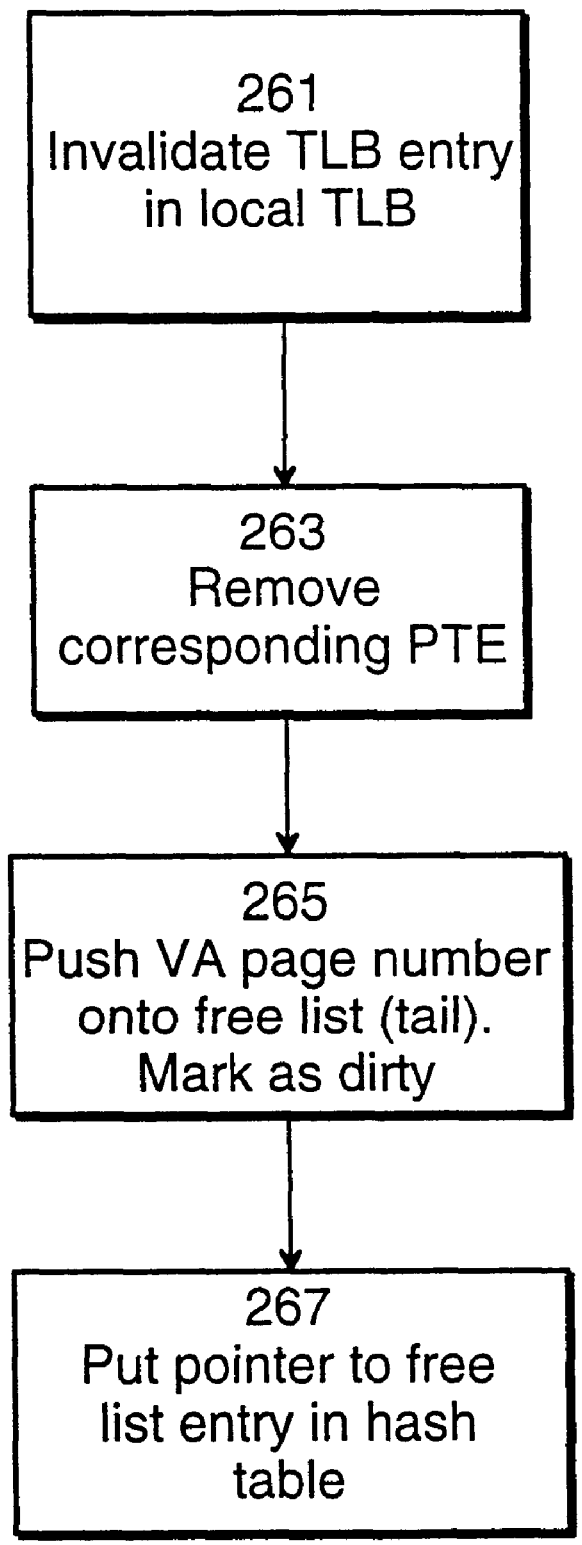
FIG. 9 is a detailed flowchart of the unmapping step of FIG. 6.

FIGS. 7–9 illustrate Steps 205, 207 and 209, respectively, of FIG. 6 in more detail.

FIG. 7, which corresponds to Step 205, provides details of mapping a virtual address to a given physical address. First, at Step 221, the physical page number is used to reference an entry in the hash table 513.

If no entry is found in the hash table, Step 223 follows, in which a virtual address page number is obtained from the entry at the head of the free list 511. That entry is then removed from the free list, Step 225. Next, at Step 227, the obtained virtual address page number is copied to the PTE corresponding to the physical page number, and the PTE is flagged as valid.

If, on the other hand, a matching entry is found in the hash table at Step 221, then Step 229 follows. In this case, the hash table entry points to a dirty free list entry, which in turn references a virtual address page. This mapping, though stale for the current processor, is still useable and in fact may be currently used by other processors which still retain the mapping in their respective TLBs. Next, the hash table entry is invalidated or removed from the hash table, and the free list entry to which it referred, which had been marked as dirty, is removed from the free list. Finally, Step 227, described above, follows.

FIG. 8, which corresponds to Step 207 of FIG. 6, provides details of accessing a mapped virtual address. At Step 241, a processor executing the thread which is accessing the address searches its TLB for a valid entry for that virtual address. If such an entry is found at Step 243, then the physical page number stored in that entry is used to access the physical memory buffer, at Step 251.

If no such entry is found at Step 243, then Step 245 follows, in which the processor looks for a valid PTE, corresponding to the virtual address, in the page table 509. If a valid PTE is found, then in Step 253, the mapping contained therein is copied to the processor's own TLB, e.g., TLB 503A for Processor A in FIG. 10A. Finally the mapping is used to access the physical memory buffer, at Step 255.

If, on the other hand, no such valid PTE is found in Step 247, then Step 249 follows, in which a hardware exception occurs, and in which, for example, the hardware may obtain a mapping if possible.

FIG. 9, which corresponds to Step 209 of FIG. 6, provides details of unmapping a virtual address. At Step 261, the TLB entry in the TLB associated with the processor requesting the unmapping is invalidated. In Step 263, the corresponding PTE in the page table is invalidated. At Step 265, the virtual address being unmapped is pushed onto the tail of the free list, and marked as dirty. Finally, at Step 267, a pointer to the new free list entry just created is placed into the hash table at an entry pointed to by a hash of the physical page number.

It will be apparent to those of ordinary skill in the art that methods involved in the present system for efficiently maintaining virtual memory consistency may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

While this invention has been particularly shown and described with references to embodiments thereof, it will be understood by those skilled in the art that various changes in form and details may be made therein without departing from the spirit and scope of the invention as defined by the appended claims.

What is claimed is:

1. A method for maintaining virtual memory consistency in a multi-processor environment, where each processor is coupled to an associated mapping mechanism with entries mapping virtual addresses to physical addresses, and where threads of a process executing in multiple processors access a common virtual address space, comprising:
   identifying, for each thread of a process, a plurality of memory mappings to be invalidated;
   upon a triggering, batching together the identified memory mappings of the process and making a list of the batched memory mappings available to each processor; and
   at each processor,
      identifying, in said processor's mapping mechanism, entries corresponding to the batched mappings, and
      invalidating said identified mapping mechanism entries.

2. The method of claim 1, wherein the triggering occurs when a predetermined threshold of identified memory mappings is exceeded.

3. The method of claim 2, further comprising:
   maintaining a list of the identified memory mappings; and
   accessing the list from each processor.

4. The method of claim 3, further comprising maintaining the list with a driver process.

5. The method of claim 4, the driver process further providing memory for database user processes.

6. The method of claim 5, further comprising, in response to the triggering, the steps of:
   in the driver process, at each processor, batching together the mapping mechanism entries corresponding to the identified memory mappings; and
   notifying each processor, via a high-priority routine, to invalidate the batched mapping mechanism entries.

7. The method of claim 6, further comprising the step of: assigning the high-priority routine a higher execution priority than ordinary user routines.

8. The method of claim 7, further comprising the step of: executing high-priority routines on all processors immediately.

9. The method of claim 1, wherein the mapping mechanism is a translation lookaside buffer (TLB).

10. A method for maintaining virtual memory consistency in a multi-processor environment in which threads of a process executing in multiple processors access a common virtual address space, comprising:
    associating a translator lookaside buffer (TLB) with each processor, each TLB comprising a plurality of TLB entries, each TLB entry mapping a virtual page number to a physical page number for a process thread executing on the processor;
    identifying a plurality of mappings invalidated by any of the process threads;
    marking the identified mappings as dirty; and
    upon a triggering, in each processor, in parallel, invalidating a plurality of TLB entries corresponding to mappings marked as dirty.

11. The method of claim 10 further comprising:
    invalidating the identified plurality of TLB entries at an essentially regular interval.

12. The method of claim 11 further comprising:
    setting the regular interval to about one second.

13. The method of claim 10 further comprising:
    invalidating the plurality of TLB entries when the number of mappings marked as dirty exceeds a predetermined threshold.

14. The method of claim 13 further comprising:
    setting the predetermined threshold to 2000.

15. The method of claim 10, further comprising:
    maintaining a free list, the free list comprising a plurality of free list entries, each free list entry comprising a reference to unmapped virtual memory.

16. The method of claim 15, further comprising:
    removing an entry from the free list when mapping virtual memory associated by the entry to physical memory;
    upon invalidating a mapping by any of said plural processors,
       invalidating an entry in the page table corresponding to the invalidated mapping;
       inserting an entry into the free list referencing virtual memory associated with the invalidated mapping; and
       marking said inserted free list entry as dirty.

17. The method of claim 16, further comprising:
    tracking free list entries marked as dirty;
    where a mapping referenced by a dirty free list entry is being accessed by a particular processor, removing the dirty entry from the free list; and
    restoring the mapping in the page table.

18. The method of claim 17, further comprising:
    maintaining a hash table, the hash table tracking the free list entries marked as dirty.

19. The method of claim 16, further comprising:
    mapping a virtual address to an identified physical address, comprising:
       if an invalidated mapping for the physical address is marked as dirty, restoring the invalidated mapping and removing the dirty marking; and
       otherwise, creating a mapping using an unmapped virtual address.

20. A method for maintaining virtual memory consistency in a multi-processor environment in which threads of a process executing in multiple processors access a common virtual address space, comprising the steps of:
    allocating physical memory to a multi-threaded process;
    mapping a subset of virtual memory associated with the process to a subset of physical memory;
    maintaining, in each processor, a translator lookaside buffer (TLB), the TLB comprising a plurality of TLB entries, each entry comprising a mapping from a virtual address in the subset of virtual memory and a physical address in the subset of physical memory;

upon invalidating the mapping in any of the TLBs, placing a reference to the subset of virtual memory into a free list, and marking the reference as dirty; and when the number of dirty references exceeds a predetermined threshold, invalidating entries in each processor's TLB.

21. The method of claim 20, wherein the step of invalidating entries in each processor's TLB further comprises: invalidating all entries in each processor's TLB.

22. The method of claim 20, further comprising:
maintaining the free list, the free list comprising a plurality of free list entries, each free list entry comprising a reference to virtual memory which is either unmapped or whose mapping is marked as dirty, wherein the step of mapping further comprises mapping a subset of physical memory to the subset of virtual memory referenced in the free list.

23. The method of claim 20, further comprising:
maintaining a page table, the page table comprising a plurality of page table entries (PTEs), each PTE comprising a mapping from a virtual address to a physical address; and when a process thread executing on a processor accesses a virtual address, first looking up the virtual address in the processor's respective TLB, and if no valid TLB entry holds a mapping for the virtual address, looking up the virtual address in the page table, and upon finding a valid mapping in the page table for the virtual address, copying, by the processor, the mapping to the processor's TLB.

24. An apparatus for maintaining virtual memory consistency in a multi-processor environment in which threads of a process executing in multiple processors access a common virtual address space, comprising:
a plurality of processors;
a plurality of translator lookaside buffers (TLBs), each TLB associated with a processor, each TLB comprising a plurality of TLB entries, each TLB entry mapping a virtual page number to a physical page number for a process thread executing on the processor;
a free list comprising a plurality of free list entries, each free list entry referencing a virtual memory address which is either unmapped or whose mapping is marked as dirty; and
means for invalidating in parallel, in each TLB, entries corresponding to mappings marked as dirty.

25. The apparatus of claim 24 wherein the means for invaliding TLB entries performs when the number of mappings marked as dirty exceeds a predetermined threshold.

26. The apparatus of claim 25, further comprising:
means for tracking free list entries marked as dirty.

27. The apparatus of claim 26, wherein means for tracking free list entries comprises a hash table.

28. A computer program product for maintaining virtual memory consistency in a multi-processor environment in which threads of a process executing in multiple processors access a common virtual address space, the computer program product comprising a computer usable medium having computer readable code thereon, including program code which:
identifies a plurality of memory mappings to be invalidated;
upon a triggering batches together the identified memory mappings and makes a list of the batched memory mappings available to each processor;
identifies, in said-processor's mapping mechanism, entries corresponding to the batched mappings; and
invalidates said identified mapping mechanism entries.

29. The computer program product of claim 28, wherein the triggering occurs when a predetermined threshold of identified memory mappings is exceeded.

30. The computer program product of claim 29, wherein the program code further:
maintains a list of the identified memory mappings; and
accesses the list from each processor.

31. The computer program product of claim 30, wherein the program code further comprises a driver process which maintains the list.

32. The computer program product of claim 31, wherein, when invalidation of the batched mapping mechanism entries is triggered, the program code further:
in the driver process, at each processor, batches together the mapping mechanism entries corresponding to the identified memory mappings; and
notifies each processor, via a high-priority routine, to invalidate the batched mapping mechanism entries.

33. The method of claim 32, wherein the program code further:
assigns the high-priority routine a higher execution priority than ordinary user routines.

34. A computer system comprising:
a plurality of processors in which threads of a process executing in multiple processors access a common virtual address space;
a memory system connected to the plurality of processors; and
a computer program, in the memory, which:
associates a translator lookaside buffer (TLB) with each processor, each TLB comprising a plurality of TLB entries, each TLB entry mapping a virtual page number to a physical page number for a process thread executing on the processor;
identifies a plurality of mappings to be invalidated;
marks the identified mappings as dirty; and
in each-processor, in parallel, invalidates a plurality of TLB entries corresponding to mappings marked as dirty.

35. The computer system of claim 34, wherein the computer program invalidates the plurality of TLB entries when the number of mappings marked as dirty exceeds a predetermined threshold.

36. A method for maintaining consistency among a plurality of translation lookaside buffers (TLBs) in a multi-processor, multi-threaded environment, each processor being associated with its own TLB, the method comprising:
allocating a physical memory buffer to a process having threads executing on plural processors;
loading the physical memory buffer with data;
allocating a subset of virtual address space to serve as a window into the physical memory buffer;
initializing a free list such that each entry of the free list references a unique page in the window;
upon a need for a thread of the process to access particular data within the physical memory buffer,
examining the TLB of the processor on which the thread is executing, and if no mapping for the particular data is found in the TLB, examining a page table, and if no mapping for the particular data is found in the page table, examining a hash table which tracks dirty entries in the free list;

if no mapping for the particular data is referenced in the hash table, removing an entry from the free list, and mapping the virtual address page to which the entry refers to a physical page containing the particular data, the mapping being accomplished by writing the physical page's page number into a page table entry indexed by the virtual address page's page number; and if a mapping for the particular data is referenced in the hash table, removing the hash table reference, removing the referenced dirty entry from the free list, and mapping the virtual address page to which the dirty entry refers to the physical page containing the particular data; and upon a process thread invalidating a mapping in the TLB of the processor in which the thread is executing,
removing the mapping from said TLB;
removing the mapping from the page table if such a page table entry exists;
pushing an entry containing the page number of the virtual page onto the free list and marking said entry as dirty; and
placing a reference to the dirty entry into the hash table.

37. A system for maintaining consistency among a plurality of translation lookaside buffers (TLBS) in a multiprocessor, multi-threaded environment, each processor being associated with its own TLB, the method comprising:

means for allocating a physical memory buffer to a process having threads executing on plural processors;

means for loading the physical memory buffer with data;

means for allocating a subset of virtual address space to serve as a window into the physical memory buffer;

free list means initialized such that each entry of the free list means references a unique page in the window;

mapping means, wherein upon a need for a thread of the process to access particular data within the physical memory buffer,
the TLB of the processor on which the thread is executing is examined, and if no mapping for the particular data is found in the TLB, a page table is examined, and if no mapping for the particular data is found in the page table, a hash table is examined which tracks dirty entries in the free list;

if no mapping for the particular data is referenced in the hash table, an entry is removed from the free list, and the virtual address page to which the entry refers is mapped to a physical page containing the particular data, the mapping being accomplished by writing the physical page's page number into a page table entry indexed by the virtual address page's page number; and if a mapping for the particular data is referenced in the hash table, the hash table reference is removed, the referenced dirty entry is removed from the free list, and the virtual address pace to which the dirty entry refers is mapped to the physical page containing the particular data; and invalidating means, wherein upon a process thread invalidating a mapping in the TLB of the processor in which the thread is executing,
the mapping is removed from said TLB;
the mapping is removed from the page table if such a page table entry exists;
an entry containing the page number of the virtual page is pushed onto the free list and marking said entry as dirty; and
a reference to the dirty entry is placed into the hash table.

\* \* \* \* \*

UNITED STATES PATENT AND TRADEMARK OFFICE
CERTIFICATE OF CORRECTION

PATENT NO. : 6,490,671 B1
DATED : December 3, 2002
INVENTOR(S) : Richard L. Frank et al.

It is certified that error appears in the above-identified patent and that said Letters Patent is hereby corrected as shown below:

Column 11,
Line 65, insert -- , -- after "triggering."

Column 12,
Line 1, delete "said-processor's" and insert -- said processor's --,
Line 41, delete "each-processor" and insert -- each processor --.

Column 13,
Line 25, delete "TLBS" and insert -- TLBs --.

Column 14,
Line 21, delete "pace" and insert -- page --.

Signed and Sealed this

Eighth Day of April, 2003

JAMES E. ROGAN
*Director of the United States Patent and Trademark Office*